Patented Mar. 7, 1939

2,149,804

UNITED STATES PATENT OFFICE 2,149,804

PLASTIC IMPRESSION COMPOUND

Ralph E. Yoder, Brooklyn, N. Y.

No Drawing. Application July 27, 1936,
Serial No. 92,849

2 Claims. (Cl. 18—47)

The object of my invention is the production of a plastic impression compound to be used in dentistry or medicine to take impressions of people's mouths, that will set quickly, that will give an accurate impression, that will not induce gagging, and which, when set, can easily be removed from the mouth (undercuts and deep overhanging ridges will break easily and can be removed and placed in the impression tray in the proper position). The composition takes an accurate, pleasant impression of a person's mouth. The impression can be taken directly after the extraction of teeth. When the plastic impression compound hardens in the mouth, it can easily be removed without the chiselling which is often necessary when using ordinary plaster of Paris for impressions. My plastic impression compound may also be used to take an impression of a broken jaw, or even masks of the living or dead. It is not as messy to use as ordinary plaster of Paris. This compound may be used instead of plaster of Paris to make plaster-placques, impressions or molds of any type, splints, facial masks, or in any other way that plaster of Paris may be used.

My compound will take an accurate impression of the mouth. After the model is poured (a separating fluid such as liquid soap may be used), and after the model is set, the impression may be removed from the model by tapping the hardened compound, or by immersing the whole in boiling water for five minutes, and then by slipping a knife between the hardened compound and the model, after which the two will easily slip apart. The two can also be separated by scraping the surface of the hardened compound with a knife.

My compound consists essentially of plaster of Paris and powdered paraffine or wax or a fatty substance, or solidified oil, or the wax-like impression material widely used by dentists. In the claims these organic materials named above are called waxy materials.

For the plaster of Paris, the so-called impression plaster of Paris, which is a mixture of plaster of Paris, whiting, and ground marble may be used, or, any of these substances may be mixed with plaster of Paris. In addition, a powdered mineral coloring matter, such as ochre (red or yellow) or any other coloring matter, a flavoring matter, such as oil of wintergreen, peppermint or menthol may be added.

In preparing the compound, I prefer to use the ingredients in the following proportions:

5 (five) pounds of powdered plaster of Paris.
1 (one) ounce of red ochre.
1 (one) ounce of oil of wintergreen.
1 (one) pound of grated or powdered paraffin.

Good results may be obtained, however, when the ingredients are varied within the following ranges: The ochre may be omitted if coloring is not desired, and the oil of wintergreen may be omitted if a pleasant odor is not desired, though the composition is not then so agreeable to the senses. The paraffin may be used in a greater or lesser proportion, from ½ (one-half) pound to 1½ (one and one-half) pounds, to vary results. Less paraffin is used if a harder impression is desired, and more paraffin is used if a softer impression is desired.

These ingredients are mixed in the following way:

The paraffin, wax, solidified oil, or similar substance is melted, and the oil of wintergreen or other flavor is added, mixed, and the mixture allowed to cool. This mixture is then ground or grated into a powder and then mixed with the plaster of Paris and ochre.

My compound is used in the same manner as plaster of Paris. The ingredients are mixed in a quantity of water sufficient to form a paste of a thick and creamy texture, or of such consistency that when placed in the impression tray, it may be inverted without the compound dropping out or flowing from the impression tray. The tray is then placed in the mouth, and pressed upon the gums so as to cause them to be inserted into the plaster, and retained in position until the plaster sets. The time necessary for the compound to set, either inside the mouth or outside, is from two to four minutes, depending on the consistency of the mixture. It may be used similarly to the way in which plaster of Paris is used. To make the mold upon which the denture is constructed is known to all dentists.

My compound must be kept in a closed container, since it absorbs moisture from the air. It is non-irritating to soft or inflammed tissues, so that an impression of a person's mouth may be taken immediately after the extraction of teeth without any uncomfortable or harmful after effects. Because of this, the dentist is enabled to take an accurate impression of a mouth after extraction of teeth without discomfort to the patient. My compound is not expensive to make. It costs only from three to five cents more a pound than the ordinary plaster of Paris that is used for similar purposes.

I claim:

1. A plastic impression compound comprising a mixture of powdered waxy material and powdered plaster of Paris.

2. A plastic dental impression compound comprising a mixture of five pounds of powdered plaster of Paris, and from one-half to one and one-half pounds of powdered paraffin wax.

RALPH E. YODER.